United States Patent [19]

Fujikawa et al.

[11] Patent Number: 4,767,807

[45] Date of Patent: Aug. 30, 1988

[54] COLORING AGENT FOR DOPE-DYEING VISCOSE RAYON

[75] Inventors: Iwao Fujikawa, Otsu; Mitsuo Kushino, Minoo; Yasuhiro Yamamoto, Sakai, all of Japan

[73] Assignee: Nippon Shokubai Kagaku Kogyo Co. Ltd., Osaka, Japan

[21] Appl. No.: 897,347

[22] Filed: Aug. 18, 1986

[30] Foreign Application Priority Data

Aug. 21, 1985 [JP] Japan ................................ 60-181822

[51] Int. Cl.$^4$ ............................ C08K 7/00; C08L 1/24
[52] U.S. Cl. ....................................... 524/36; 524/597; 106/164; 106/165
[58] Field of Search .................. 524/36, 597; 106/164, 106/165

[56] References Cited

U.S. PATENT DOCUMENTS

| | | | |
|---|---|---|---|
| 2,993,018 | 7/1961 | Steinlin | 524/36 |
| 3,252,816 | 5/1966 | Sievenpiper | 106/165 |
| 3,793,419 | 2/1974 | Steinlin et al. | 106/165 |
| 3,945,980 | 3/1976 | Tsubakimoto et al. | 524/598 |
| 4,069,176 | 1/1978 | Tsubakimoto et al. | 524/598 |

FOREIGN PATENT DOCUMENTS 62-41310 2/1987 Japan ..................... 524/36

*Primary Examiner*—Lewis T. Jacobs
*Attorney, Agent, or Firm*—Omiri M. Behr

[57] ABSTRACT

A coloring agent for the dope-dyeing viscose rayon, comprising minute spherical cured particles of an amino resin produced from formaldehyde and at least one amino compound selected from the group consisting of benzoguanamine, melamine, and urea and colored with a dye, a viscose composition containing the coloring agent, a viscose rayon obtained by spinning the composition, and a method for manufacture thereof.

10 Claims, No Drawings

COLORING AGENT FOR DOPE-DYEING VISCOSE RAYON

BACKGROUND OF THE INVENTION

1. Field of the Invention

This invention relates to a coloring agent for a dope-dyeing viscose rayon, which is excellent in dispersibility in viscose and capable of permitting production of a rayon fiber excelling in spinnability and possessing a satisfactory gloss and a brilliant tint, to a colored viscose rayon, and to a method for the production of the colored viscose rayon.

2. Description of the Prior Art

Heretofore, as means of producing a colored viscose rayon, the so-called dope-dyeing method, i.e. the method which produces a colored rayon fiber by having a coloring agent such as a pigment, a sulfide dye, or a vat dye dispersed or dissolved in advance in a spinning dope such as viscose and subsequently spinning the resulting spinning dope has been widely practiced (Japanese Patent Publication No. SHO 47(1972)-51,968). In the working of this method, pigments insoluble in water are used more often than not as the coloring agent. For the purpose of improving the spinnability of the dope to be prepared and the gloss and tint of the rayon to be produced, therefore, the need of enabling the pigment to be uniformly dispersed in the spinning dope has been strongly emphasized.

In the spinning of viscose rayon, a spinning bath containing sulfuric acid or a salt such as zinc sulfate or sodium sulfate in a relatively high concentration is used. It has been pointed out that when a pigment is used as the coloring agent, since the viscose during the course of the spinning comes into contact with the bath containing high concentration of acids or salts as mentioned above, the pigment dispersed in the viscose undergoes cohesion to form large particles and consequently impair the spinnability of the viscose as evinced by frequent yarn breakage and clogging of the spinneret. When a sulfide dye or a vat dye is used, the dye is solubilized by addition of a reducing agent in an amount equal to or greater than the amount of the dye before the dye is added to the viscose. Most of such dyes are deficient in stable solubility and are apt to form large particles. Thus, the use of the dye has the disadvantage that it will induce impairment of the spinnability. An attempt at using a dye of a relatively brilliant tint such as, for example, a basic dye poses the drawback that the dye is deficient in solubility in the viscose and, therefore, is incapable of producing the brilliant tint inherent in the dye and the tint produced at all is varied by the spinning bath containing high concentration of acids or salts.

The coloring agent for the dope-dyeing viscose rayon is required to possess dispersion stability enough to withstand harsh conditions as described above. In the pigments and dyes currently available in the market, only a very few of them are satisfactorily usable as the coloring agent. It is, therefore, extremely difficult to obtain a coloring agent of desired tint. Particularly, a coloring agent capable of giving rise to a dope-dyed viscose rayon fiber of brilliant tint remains yet to be developed.

This invention is directed to eliminating the aforementioned drawbacks concerning the coloring agent for the dope-dyeing viscose rayon.

An object of this invention, therefore, is to provide a coloring agent for the dope-dyeing viscose rayon which is excellent in dispersibility in the viscose and is capable of givng rise to a rayon fiber withstanding the spinning bath containing high concentration acids or salts and possessing a satisfactory gloss and a brilliant tint.

Another object of this invention is to provide a colored viscose rayon and a method for the manufacture of the colored viscose rayon.

SUMMARY OF THE INVENTION

The objects described above are accomplished by a coloring agent for the dope-dyeing viscose rayon, which comprises minute spherical cured particles of an amino resin produced from formaldehyde and at least one amino compound selected from the group consisting of benzoguanamine, melamine, and urea and colored with a dye.

These objects are further accomplished by a dope-dyeing viscose rayon spinning composition, which is produced by incorporating in the viscose 0.1 to 10 parts by weight, based on 100 parts by weight of viscose, of a coloring agent comprising minute spherical cured particles of an amino resin produced from formaldehyde and at least one amino compound selected from the group consisting of benzoguanamine, melamine, and urea and colored with a dye.

These objects are also accomplished by a colored viscose rayon, produced by uniformly dispersing in the viscose rayon 1 to 30 parts by weight, based on 100 parts by weight of viscose rayon, of a coloring agent comprising minute spherical cured particles of an amino resin produced from formaldehyde and at least one amino compound selected from the group consisting of benzoguanamine, melamine, and urea and colored with a dye.

Further, these objects are accomplished by a method for the manufacture of a colored viscose rayon, characterized by uniformly dispersing in a viscose a coloring agent comprising minute spherical cured particles of an amino resin produced from formaldehyde and at least one amino compound selected from the group consisting of benzoguanamine, melamine, and urea and colored with a dye and subsequently spinning the viscose composition obtained consequently.

DESCRIPTION OF PREFERRED EMBODIMENT

The "amino resin" is the generic term for all the resins that are produced by the condensation reaction of amino group-containing compounds such as melamine, urea, benzoguanamine, and acetoguanamine with aldehydes represented by formaldehyde. The resins produced from all possible combinations of the component compounds are usable for the purpose of this invention. In consideration of the color producing property of the dye to be described more fully afterward, a benzoguanamine-formaldehyde resin and a benzoguanamine melamine-formaldehyde resin prove particularly desirable among other possible amino resins suggested above. These amino resins which have benzoguanamine as an indispensable component have the advantage that they are uniformly colored by the dye and they are allowed to emit the brilliant tint inherent in the dye because of their satisfactory color producing property.

For the purpose of this invention, it is essential that the amino resin should be colored with a dye. From among various dyes, any dye of a desired tint may be selected and used for the coloration. The dye to be used has no specific limitation except for the sole requirement that it should be able to give rise to a colored amino resin emitting a brilliant tint inherent therein to advantage. As typical examples of the dye, water-soluble monoazo and polyazo dyes, metal-containing azo dyes, disperse azo dyes, anthraquinone acid dyes, anthraquinone vat dyes, alizarin dyes, disperse anthraquinone dyes, indigo dyes, sulfide dyes, phthalocyanine dyes, diphenylmethane and triphenylmethane dyes, nitro dyes, nitroso dyes, thiazole dyes, xanthene dyes, acridine dyes, azine dyes, oxazine dyes, thiazine dyes, benzoquinone dyes, naphthoquinone dyes, and cyanine dyes may be cited. From among the dyes enumerated above, a particular dye possessing a tint and lightfastness fit for the intended application of the production can be suitably selected and used.

The minute spherical cured particles of an amino resin colored with a dye to be used as the coloring agent for the dope-dyeing viscose rayon contemplated by this invention (hereinafter referred to as "minute spherical cured particles of colored resin") are spheres devoid of surface irregularities, substantialy uniform in particle diameter, incapable of readily inducing secondary aggregation, and highly compatible with the viscose. Thus, they excel in dispersibility in the viscose. Since the minute spherical cured particles of colored resin are made of an insoluble and infusible resin, they are also excellent in resistance to heat, solvent, acids, alkalis, and color migration. They are, therefore, capable of amply enduring the process of viscose rayon production which involves the use of a spinning bath of concentrated acid or salt and treatments at elevated temperatures.

The minute spherical cured particles of colored resin possessing the outstanding properties described above may be produced by any of the known methods which are capable of producing the particles defined above. Examples of such methods are the methods proposed by the same inventors as in U.S. Pat. Nos. 3,945,980, 4,069,176, Japanese Patent Publication Nos. SHO 58(1983-24,444, and SHO 59(1984)-48,007. By the methods so disclosed in the patent publications, minute spherical cured particles of colored resin excelling in resistance to heat, solvent, acids, alkalis, and color migration and possessing a substantially uniform particle diameter can be produced in any desired particle diameter. These methods are, for example, represented by the following ones.

1. The method for the production of fine spherical cured resin particles which comprises causing benzoguanamine or a mixture of 100 to 50 parts by weight of benzoguanamine with 0 to 50 parts by weight of melamine to react with formaldehyde at a ratio of 1 mol of benzoguanamine or the mixture thereof to 1.2 to 3.5 mols of formaldehyde until the reaction product is rendered hydrophobic, coloring the reaction product with a dye, then adding the colored reaction product into a stirred aqueous protective colloid solution thereby emulsifying the reaction product, the emulsion in the presence of a curing catalyst added thereto, thereby forming a suspension of a fine spherical cured resin, separating the cured resin from the suspension, washing with water and drying the resin, and thereafter crushing the same into fine spherical particles (U.S. Pat. No. 3,945,980).

These reactions are carried out at a pH in the range of 5 to 10 at a temperature in the range of 50° to 100° C. The curing of the reaction product in its emulsified state is effected by heating the emulsion in the presence of a curing catalyst added thereto at a temperature of 50° to 100° C. The curing catalyst can be suitably selected from a host of polymerization curing catalysts used for amino type resins. Examples of the catalyst include mineral acids such as hydrochloric acid, sulfuric acid and phosphoric acid, carboxylic acids such as benzoic acid, phthalic acid, acetic acid, propionic acid and salicylic acid, ammonium salts such as ammonium chloride and ammonium phosphate, sulfonic acids such as benzene sulfonic acid, p-toluene sulfonic acid, dodecyl benezene sulfonic acid, and various other latent curing catalysts. Amony other catalysts, sulfonic acids prove particularly desirable. The polymerization curing catalyst is effectively used in an amount of 0.01 to 8 parts by weight, preferably 0.2 to 5 parts by weight, based on 100 parts by weight of the reaction product.

2. The method for the production of fine colored resin particles of excellent dispersiblity which comprises subjecting 100 parts by weight (as resin solids) of an emulsion of uncured benzoguanamine type resin colored with a dye to a curing reaction in the presence of 1 to 15 parts by weight of extremely finely divided silica particles not more than 0.05 μm in diameter and 50 to 400 $m^2/g$ of specific surface area as measured by the Brunauer-Emmett-Taller method and 0.01 to 8 parts by weight of a curing catalyst added thereto, stopping the curing reaction of the resin in an emulsified state incorporating therein the extremely fine silica particles and the curing catalyst, separating the cured resin from the aqueous medium, and drying the separated resin (U.S. Pat. No. 4,069,176).

The emulsion of the uncured benzoguanamine type resin is produced by causing benzoguanamine or a mixture of 100 to 50 parts by weight of benzoguanamine with 0 to 50 parts by weight of melamine to react with formaldehyde at a ratio of 1 mol of benzoguanamine or the mixture thereof to 1.2 to 3.5 moles of formaldehyde, coloring the resultant reaction produce and then emulsifying the colored reaction product with a protective colloid or by first emulsifying the reaction product and then coloring the emulsified reaction product. The kind of the curing catalyst and the amount of the curing catalyst used in the reaction are similar to those of the preceding method.

3. The method of Japanese Patent Publication No. SHO 59(1984)-48,007 produces minute colored resin particles excelling in lightfastness by adding to the emulsion of an uncured benzoguanamine type resin colored with a dye a water-soluble ultraviolet absorbent possessing a sulfonic acid group and optionally a water-soluble initial condensate of melamine with formaldehyde or a water-soluble initial condensate of formaldehyde with a mixture consisting of 100 to 50 parts by weight of melamine and 0 to 50 parts by weight of benzoguanamine, when necessary further adding thereto other curing catalyst, causing the resin in the form of emulsion to undergo a curing reaction, separating the cured resin from the aqueous medium, and drying the separated resin.

The other curing catalyst can be any of the curing catalysts used for the condensation of amino type resins. Typical examples of such curing catalysts include mineral acids such as hydrochloric acid, sulfuric acid, and phosphoric acid, carboxylic acids such as benzoic acid, phthalic acid, and acetic acid, and sulfonic acids such as benzenesulfonic acid and dodecylbenzenesulfonic acid.

4. The method of Japanese Patent Publication No. SHO 58(1983)-24,444 produces minute colored resin particles excelling in resistance to solvent and to heat by causing formaldehyde to react with a mixture consisting of 99 to 65 parts by weight of benzoguanamine and 1 to 35 parts by weight of p-toluenesulfonamide at a ratio of 1.2 to 3.5 moles of formaldehyde to 1 mol of the mixture in an aqueous medium thereby producing a soluble and fusible resin, coloring the resin with a dye, emulsifying the colored resin with a protective colloid, adding a curing catalyst to the emulsified resin thereby enabling the resin to retain the emulsified state thereof and stopping the curing reaction and allowing the resin to assume an insoluble and infusible state, separating from the resulting suspension of minute colored resin particles the cured resin, and drying the separated cured resin.

When the rayon fiber is to be spun in the form of single yarn of a thickness of 5 deniers, the minute spherical cured particles of colored resin desirably have an average particle diameter in the range of 0.1 to 10 $\mu$m, preferably 0.1 to 2 $\mu$m, in view of the dispersibility of the particles in the viscose and in the light of the fact that the orifices of the viscose spinneret have a diameter of about 80 microns. By the aforementioned known method for the production of minute spherical cured particles of colored resin, minute spherical cured particles of colored resin possessing an average particle diameter in the range of 0.1 to 10 $\mu$m can be easily obtained. In accordance with this method, minute spherical cured particles of colored resin of an average particle diameter falling in a more desirable range can be obtained by suitably selecting the conditions of production. The amount of the dye to be used for the coloration is in the range of 0.1 to 10 parts by weight, preferably 0.3 to 3 parts by weight, based on 100 parts by weight of the amino resin.

As the coloring agent for the dope-dyeing viscose rayon of this invention, the minute spherical cured particles of colored resin are put to use as added to and mixed with viscose. This mixing can be accomplished with an extremely simple mixing device instead of using any special mixing or kneading device. The composition of the viscose for which the coloring agent of this invention is intended and the composition of the spinning bath used for spinning the viscose are not specifically limited.

The amount of the coloring agent for the dope-dyeing viscose rayon of the present invention to be added to the viscose is in the range of 0.1 to 10 parts by weight, preferably 0.3 to 3 parts by weight, based on 100 parts by weight of the viscose. When the coloring agent of this invention is added to the viscose to fulfil the part thereof, it may be used jointly with other coloring agent such as a pigment or dye and a surfactant capable of assisting in dispersing the coloring agent in the viscose.

The viscose is a viscous aqueous solution obtained by immersing pulp in an aqueous alkali solution thereby producing an alkali cellulose and adding carbon disulfide to the alkali cellulose. Desirably, the viscose containing 6 to 12% by weight, preferably 7 to 70% by weight, of cellulose and 3 to 10% by weight, preferably 4 to 8% by weight, of an alkali hydroxide (such as, for example. sodium hydroxide).

Since the coloring agent for the dope-dyeing viscose rayon of the present invention comprises minute spherical cured particles of an amino resin which have a substantially uniform particle diameter, possess high affinity for viscose, and are insoluble and infusible, it is excellent in spinnability and dispersibility in viscose. Even when the viscose containing the coloring agent is to be spun in a small thickness of not more than 5 deniers, it can be spun stably without entailing any yarn breakage.

The spinning of the viscose is carried out similarly to the production of the conventional viscose rayon. The content of minute spherical cured particles of colored resin in the viscose rayon to be obtained as described above desirably falls in the range of 1 to 30% by weight, preferably 2 to 15% by weight.

The coloring agent of the present invention can be produced by coloring the amino resin with a dye of a desired tint to be selected from among a rich variety of dyes. It, therefore, has an effect of permitting production of a rayon fiber or rayon staple possessing a brilliant tint never attainable with the conventional coloring agent for the dope-dyeing viscose rayon.

Further, when the coloring agent for the dope-dyeing viscose rayon of the present invention is used, the minute spherical cured particles of amino resin distributed in the rayon fiber scatter light and consequently moderate the intense gloss peculiar to the viscose rayon. The rayon fiber finally produced acquires a beautiful appearance rich in highly desirable soft gloss.

Now, the present invention will be described below with reference to working examples. It should be noted that the present invention has its scope not limited by these working examples in any sense.

SYNTHESIS 1

In a four-necked flask provided with a stirrer, a reflux condenser, and a thermometer, 240 g (1.3 moles) of benzoguanamine, 60 g (0.5 mole) of melamine, 323.4 g (4.0 moles) of formalin having a concentration of 37%, and 1.30 g of an aqueous 10% sodium carbonate were stirred and left reacting at 94° to 95° C. for 5 hours. The reaction product was hydrophobic and turbid in white.

In an aqueous solution obtained by dissolving 42.0 g of polyvinyl alcohol (produced by Kuraray Co., Ltd. and marketed under trademark designation of "PVA 205") in 521.0 g of water, the solution of the reaction product was emulsified by vigorous stirring with a homo-mixer. The resulting emulsion was cooled to 30° C. Then, the cooled emulsion and 1.5 g of Rhodamine B and 1.5 g of Rhodamine 6GCP added thereto were stirred for 15 minutes. The resulting mixture and 4.62 g of dodecyl-benezenesulfonic acid added thereto were heated and stirred for two hours each successively at the varied temperatures of 40° C., 50° C., 70° C., and 90° C. so as to be polymerized and cured in the emulsified state.

The filter cake obtained by separating the polymerized and cured emulsion with a filter was dried at 100° C. and heated at 150° C. for 3 hours and then grinded. Consequently, there were obtained minute spherical cured particles of a colored benzoguanamine melamine-formaldehyde resin.

The minute spherical particles thus obtained were formed of a cured resin possessing an average particle diameter of 0.5 micron, a pinky fluorescent color, and a softening point of not less than 300° C.

SYNTHESIS 2

In the same flask as used in Synthesis 1, 150 g (0.8 mole) of benzoguanamine, 160 g (2.0 moles) of 37% formalin, and 0.65 g of an aqueous 10% sodium carbonate were stirred and left reacting at 94° to 95° C. for 4 hours. The reaction product and 1.5 g of a fluorescent whitening agent (produced by Ciba Geigy and marketed under trademark designation of "UVITEX$^R$OB") added thereto were stirred at 94° to 95° C. for 60 minutes to effect coloration of the reaction product.

In an aqueous solution obtained by dissolving 10.5 g of polyvinyl alcohol (produced by Kurary Co., Ltd. and marketed under trademark designation of "PVA205") in 145 g of water, the solution containing the reaction product was vigorously stirred with a homo-mixer to emulsify the solution containing the reaction product. The resulting emulsion and 2.10 g of dodecylbenzenesulfonic acid added thereto were heated and stirred for two hours each successively at the varied temperatures of 50° C., 70° C., 80° C., and 90° C. so as to be polymerized and cured in the emulsified state.

The filter cake obtained by separating the polymerized and cured emulsion with a filter were dried, heated, and grinded by following the procedure of Synthesis 1, to obtain minute spherical cured particles of colored benzoguanamine-formaldehyde resin.

The minute spherical particles thus obtained were formed of a cured resin having an average particle diameter of 0.5 micron and a high degree of whiteness and a softening point of not less than 300° C.

EXAMPLE 1

A colored viscose composition was obtained by thoroughly mixing 100 parts of a viscose containing 8.5% by weight of cellulose and 6.0% by weight of total alkali and possessing a Hottenroth number of 11.8 with 1 part by weight of the minute spherical cured particles of colored benzoguanamine melamine-formaldehyde resin obtained in Synthesis 1. A rayon fiber of a thickness of 50 deniers/20 filaments was obtained by spinning the colored composition at a spinning speed of 90 m/min. and an immersion length of 60 cm into a spinning bath containing 150 g of sulfuric acid per liter, 345 g of sodium sulfate per liter, and 15 g of zinc sulfate per liter and kept at 60° C. The rayon fiber so obtained was a beautiful fiber having a brilliant pinky fluorescent color and emitting a desirable soft gloss. During the course of the spinning, such troubles as yarn breakage and clogging of the viscose spinneret were not observed at all. The colored amino resin content in the rayon fiber was 10.5% by weight.

EXAMPLE 2

A colored viscose composition was produced by thoroughly mixing 100 parts by weight of the same viscose as used in Example 1 with 1 part by weight of the minute spherical particles of a colored benzoguanamine-formaldehyde resin obtained in Synthesis 2. This composition was spun into a first coagulation bath containing 100 g of sulfuric acid per liter, 350 g of sodium sulfate per liter, and 20 g of zinc sulfate per liter and kept at 40° C.

The spun thread of the composition was led into a second bath containing 10 g of sulfuric acid per liter and kept at 90° C., there to be stretched and completely regenerated. The rayon fiber consequently obtained was cut into pieces 50 mm in length and dried to afford rayon staple.

The produced rayon staple had a thickness of 5 deniers and possessed a very high degree of whiteness. During the course of the spinning, such troubles as yarn breakage and clogging of the viscose spinneret were not observed at all. The colored amino resin content in the rayon staple was 10.5% by weight.

What is claimed is:

1. A dope-dyeing viscose rayon spinning composition, produced by incorporating in the viscose 0.1 to 10 parts by weight, based on 100 parts by weight of the viscose, of a coloring agent comprising minute spherical cured particles of an amino resin produced from formaldehyde and at least one amino compound selected from the group consisting of benzoguanamine, melamine, and urea and colored with a dye.

2. A composition according to claim 1, wherein said amino resin is a benzoguanamine-formaldehyde resin or a benzoguanamine.melamine-formaldehyde resin.

3. A composition according to claim 1, wherein said minute spherical cured particles have an average particle diameter in the range of 0.1 to 10 microns.

4. A composition according to claim 1, wherein said minute spherical cured particles have an average particle diameter in the range of 0.1 to 2 microns.

5. A composition according to claim 1, wherein said coloring agent is incorporated in an amount in the range of 0.3 to 3 parts by weight based on 100 parts by weight of the viscose.

6. A colored viscose rayon, produced by uniformly dispersing in the viscose rayon 1 to 30 parts by weight, based on 100 parts by weight of the viscose rayon, of a coloring agent comprising minute spherical cured particles of an amino resin produced from formaldehyde and at least one amino compound selected from the group consisting of benzoguanamine, melamine and urea and colored with a dye.

7. A colored viscose rayon according to claim 6, wherein said amino resin is a benzoguanamine-formaldehyde resin or a benzoguanamine.melamine-formaldehyde resin.

8. A colored viscose rayon according to claim 6, wherein said minute spherical cured particles have an average particle diameter in the range of 0.1 to 10 microns.

9. A colored viscose rayon according to claim 6, wherein said minute spherical cured particles have an average particle diameter in the range of 0.1 to 2 microns.

10. A colored viscose rayon according to claim 6, wherein said coloring agent is dispersed in an amount in the range of 2 to 15 parts by weight based on 100 parts by weight of the viscose rayon.

* * * * *